United States Patent
Friedman et al.

(10) Patent No.: US 6,942,434 B2
(45) Date of Patent: Sep. 13, 2005

(54) METAL CUTTING TOOL

(75) Inventors: Jacob Friedman, Kfar Vradim (IL); Baruch Books, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 34 days.

(21) Appl. No.: 10/365,626

(22) Filed: Feb. 13, 2003

(65) Prior Publication Data

US 2003/0156910 A1 Aug. 21, 2003

(30) Foreign Application Priority Data

Feb. 19, 2002 (IL) .................................................. 148228
Oct. 7, 2002 (IL) .................................................. 152161

(51) Int. Cl.⁷ ............................. B23B 27/06; B23D 1/00
(52) U.S. Cl. ........................................ 407/113; 407/114
(58) Field of Search .................................... 407/113, 114, 407/115, 116, 117

(56) References Cited

U.S. PATENT DOCUMENTS

| | | | | |
|---|---|---|---|---|
| 2,508,183 A | * | 5/1950 | Mitchell ..................... | 407/120 |
| 3,180,006 A | * | 4/1965 | Emmons ..................... | 407/70 |
| 3,344,496 A | * | 10/1967 | Patkay ....................... | 407/114 |
| 3,520,042 A | * | 7/1970 | Stier .......................... | 407/89 |
| 3,613,197 A | | 10/1971 | Stier | |
| 3,805,350 A | * | 4/1974 | Stein .......................... | 407/113 |
| 3,813,746 A | * | 6/1974 | Price .......................... | 407/104 |
| 4,169,690 A | | 10/1979 | Kendra | |
| 4,320,996 A | | 3/1982 | Roos | |
| 4,632,593 A | * | 12/1986 | Stashko ..................... | 403/316 |
| 4,755,085 A | * | 7/1988 | Muren et al. ............... | 407/113 |
| 5,004,379 A | | 4/1991 | Little | |
| 5,308,197 A | | 5/1994 | Little | |
| 2001/0022123 A1 | | 9/2001 | Schiffers | |

* cited by examiner

Primary Examiner—A. L. Wellington
Assistant Examiner—Dana Ross
(74) Attorney, Agent, or Firm—Womble Carlyle (57) ABSTRACT

A metal cutting tool having an indexable cutting insert retained in an insert pocket of an insert holder. The cutting insert has two opposing side surfaces with a peripheral edge surface extending therebetween and a plurality of cutting portions. The peripheral edge surface has a plurality of abutment sections, each abutment section lying on a portion of a sidewall of an imaginary regular polygon. A plurality of cutting portions extend outwardly from the imaginary polygon and are equal in number to the number of side walls thereof. Each abutment section is located between two cutting portions. The insert holder has an insert pocket in which the cutting insert is retained with the peripheral edge surface being abutted at two abutment sections by two support walls of the insert pocket, the support walls being fixed and integral parts of the insert holder.

20 Claims, 4 Drawing Sheets

FIG.4

METAL CUTTING TOOL

FIELD OF THE INVENTION

The present invention relates to metal cutting tools for use in turning, grooving, parting, and threading operations having an indexable insert with a plurality of cutting edges.

BACKGROUND OF THE INVENTION

Metal cutting tools of this type are well known in the art. U.S. Pat. No. 4,320,996 discloses a cutoff tool that enables narrow grooves to be produced. The tool consists of a holder having a recess in one side face in which a cutting insert is located and clamped by means of a center screw threadably engageable with the holder. The insert is triangular and is provided with a protruding triangular central portion, which is received in the recess, whereas the remainder of the insert extends laterally from the holder for cutoff purposes. Since the insert has a protruding central portion, it is one-handed, that is, if the insert has been designed for a right-handed tool, as shown in U.S. Pat. No. 4,320,996, then it can only be used with a right-handed tool.

U.S. Pat. No. 4,169,690 discloses an indexable insert for heavy-duty capabilities. The cutting insert has a plurality of cutting edge portions extending outwardly from a central body portion. The insert is held in a pocket of a holder by a clamp arm either from the side or from the top.

U.S. Pat. No. 5,308,197 discloses a machining apparatus, comprising a holder bar with a pocket member that mounts on the bar that holds an insert. The insert has a mount portion and a plurality of arms. The mount portion locating sides bear against a pair of positioning sides of the pocket member.

U.S. Pat. No. 3,613,197 discloses an indexable and reversible, threading or grooving insert. It includes an insert support that engages the insert at the lower cutting edge. The insert support screws to the tool body and engages the cutting arm in use, limiting depth of cut.

U.S. patent application Publication No. 2001/0022123 A1, describes in one embodiment (see FIG. 2) a holding element in which a cutting bit with four cutting edges sits on the holding element at three spaced apart locations 10', 10", and 10'". It is pointed out that the cutting bit can, in principle, also touch the holding element at a fourth location 10"" and that during use for the intended purpose a force is exerted on the cutting bit so that the bit would possibly no longer rest on the holding element at the fourth location 10"". This means that in principle the cutting bit is not stably seated. The cutting bit would be in one position with 4 points of contact before use and then would move to another position with three points of contact during use.

SUMMARY OF THE INVENTION

In accordance with the present invention there is provided a metal cutting tool comprising:

an indexable cutting insert, comprising two opposing side surfaces, and a peripheral edge surface extending therebetween and having an insert axis of rotational symmetry passing through the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions; and an insert holder comprising an insert pocket in which the cutting insert is retained with the peripheral edge surface being abutted at two abutment sections only, the insert pocket comprising a lower support wall abutting a first abutment section, and an upper support wall abutting a second abutment section; the lower support wall and the upper support wall having a unitary, one-piece construction.

In accordance with the present invention, the upper support wall and the lower support wall define an acute angle $\alpha$ between them.

In accordance with a specific application, the acute angle $\alpha$ is 36°.

In accordance with a preferred embodiment of the present invention, the cutting portions are generally triangular in a side view of the cutting insert.

In a preferred application of the present invention, the cutting tool is for grooving, parting and turning.

In accordance with a preferred embodiment of the present invention, the cutting insert has a varying width dimension, taken in a direction parallel to the insert axis.

Preferably, the cutting insert has three width dimensions, a first width dimension, D1, at the cutting portions, a second width dimension, D2, at a generally centrally located region of the cutting insert and a third width dimension D3, at all other regions of the cutting insert.

Further preferably, the second width dimension D2 is greater than the first width dimension D1, and the first width dimension D1 is greater than the third width dimension D3.

Still further preferably, the generally centrally located region of the cutting insert having the second width dimension is polygonal in form, from a side view of the cutting insert, thereby forming a protruding polygon from each side surface.

Typically, the imaginary polygon has a polygon axis that is coincident with the insert axis.

If desired the protruding polygon is angularly offset from the imaginary polygon with respect to the insert axis.

In accordance with a preferred embodiment present invention, the regular imaginary polygon is a regular imaginary pentagon; the cutting insert having five abutment sections, each abutment section lying on a portion of a side wall of the imaginary regular pentagon; five cutting portions spaced at regular intervals one from the other; and the protruding polygons are protruding pentagons, each protruding pentagon having an area smaller than a surface area of the imaginary pentagon and each protruding pentagon is angularly offset with respect to the imaginary pentagon.

In accordance with the present invention, the insert pocket comprises a base surface from which the lower and upper support walls generally uprightly extend, the base surface being abutted by a given protruding polygon of the cutting insert.

In accordance with the present invention, the cutting tool further comprises a screw, for securing the insert in the insert pocket, the screw extending through an insert through bore and threadingly engaged with a threaded receiving bore in the base surface; the insert through bore extending between the two opposing side surfaces.

In accordance with the present invention, the insert through bore extends between the protruding polygons.

In accordance with the preferred embodiment present invention, the operative first and second abutment sections divide the cutting insert into two sections.

Further in accordance with the preferred embodiment present invention, a first section contains an operative cutting portion and two cutting portions on either side of the operative cutting portion and a second section contains two adjacent cutting portions.

BRIEF DESCRIPTION OF THE DRAWINGS

For a better understanding, the invention will now be described, by way of example only, with reference to the accompanying drawings in which.

DETAILED DESCRIPTION OF THE INVENTION

Figure 1:
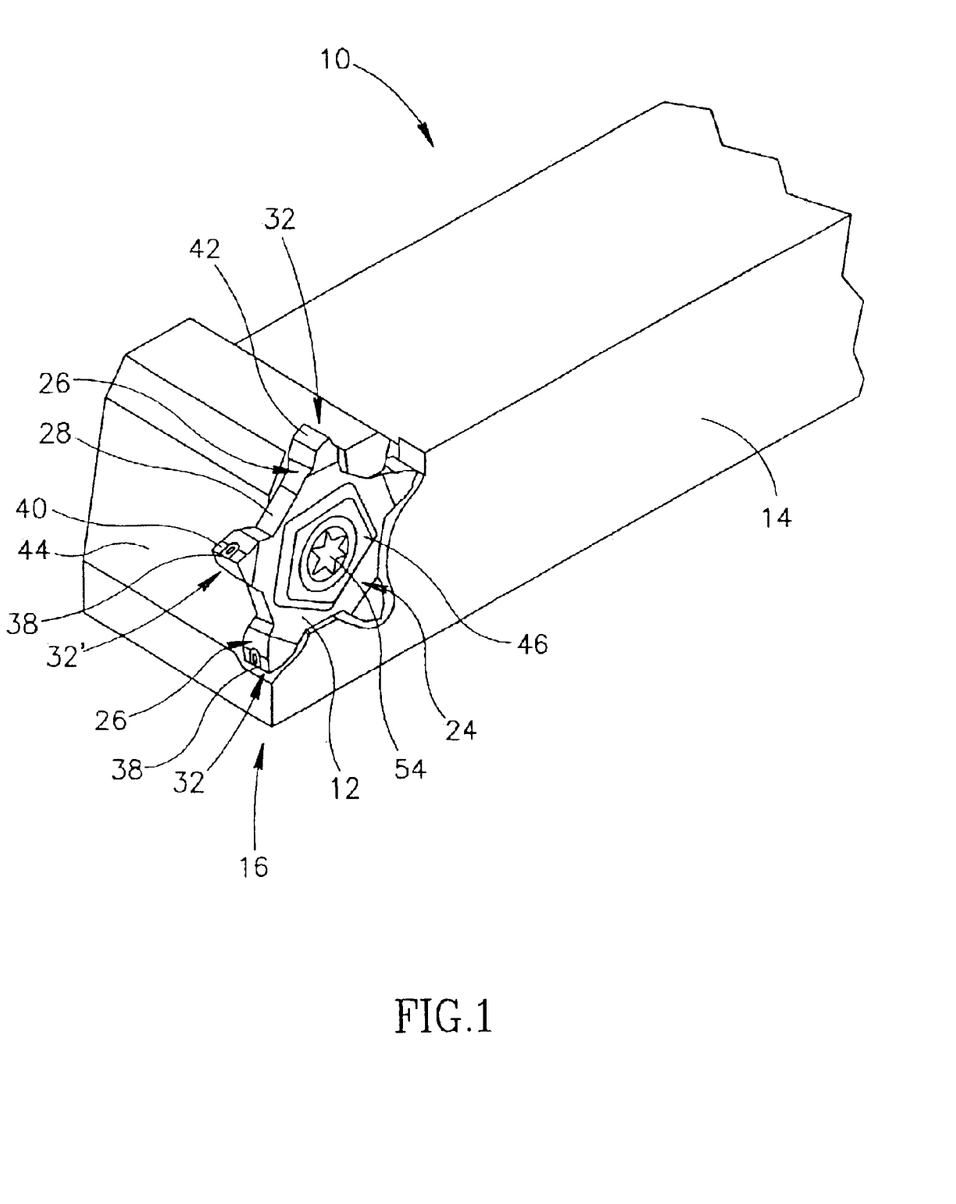
FIG. 1 is an perspective view of a metal cutting tool in accordance with the present invention.
Figure 2:
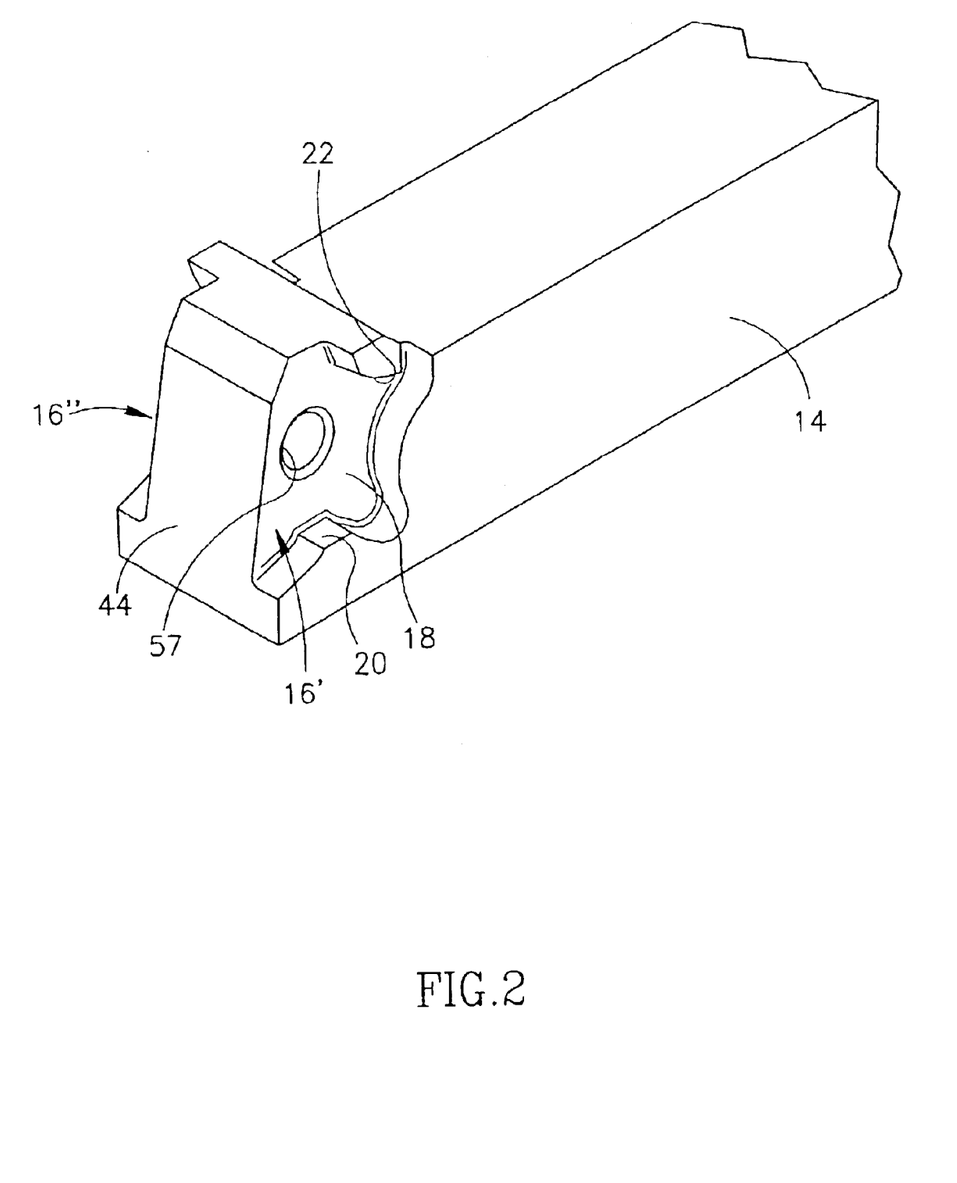
FIG. 2 is an perspective view of an insert holder in accordance with the present invention.
Figure 3:
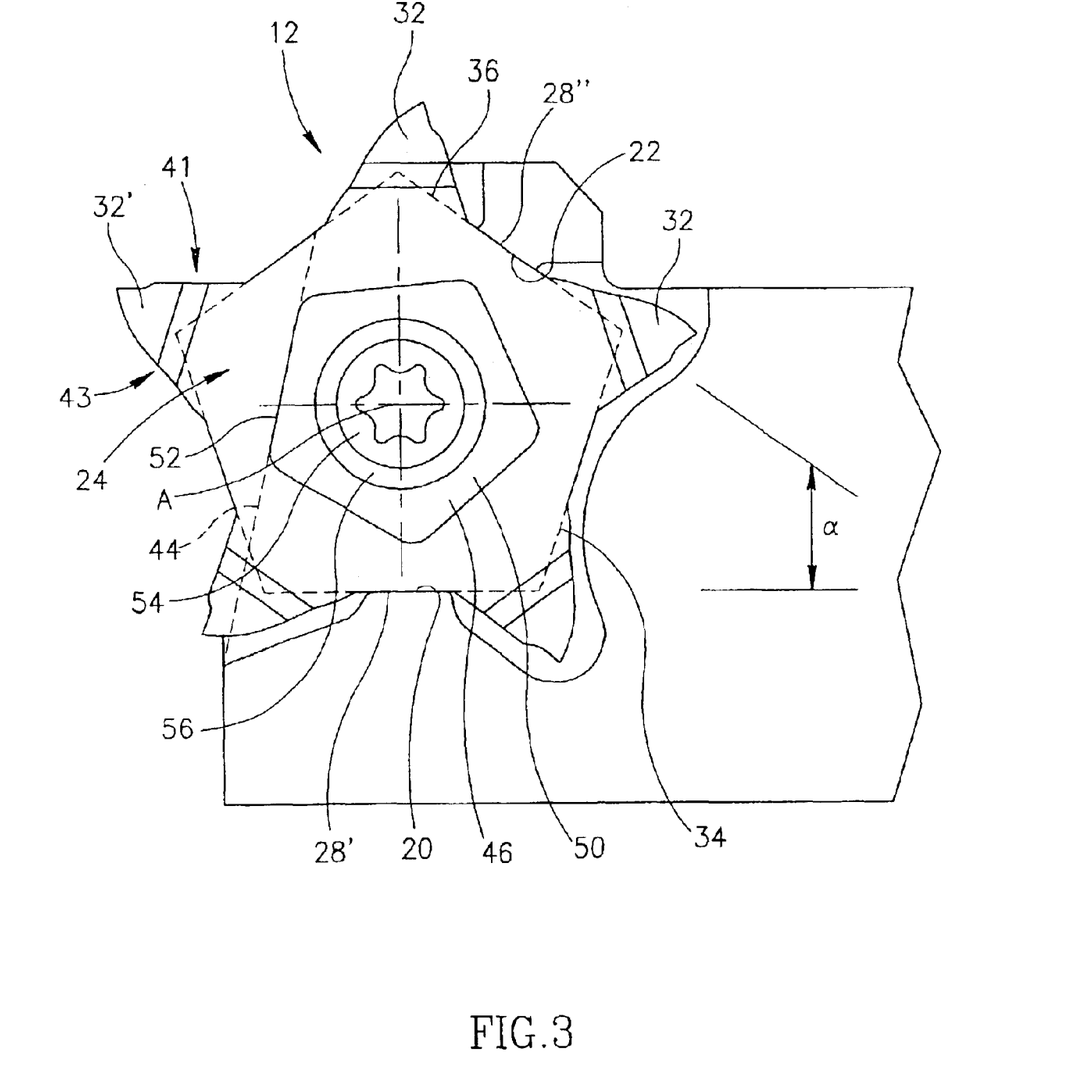
FIG. 3 is a side view of the metal cutting tool shown in FIG. 1.

Attention is first drawn to FIGS. 1–3, showing a metal cutting tool 10 in accordance with the present invention. The metal cutting tool 10 comprises a cutting insert 12, having an insert axis A, and an insert holder 14 with the cutting insert 12 retained in an insert pocket 16 (16', 16") of the insert holder 14. The cutting insert 12 is produced by form pressing and sintering a hard metal body made from a carbide powder such as Tungsten Carbide. However, the cutting insert 12 can also be produced by injection molding. The insert holder 14 is formed of machined steel or other hard materials. The insert holder 14, shown in FIG. 2, has two insert pockets 16, one 16' for right-handed cutting operations and the other 16" for left-handed cutting operations. The cutting insert 12, which will be described in detail below, can be used for both right-handed and left-handed cutting operations and as such can be retained in either of the insert pockets 16', 16". The insert axis A is an axis of rotational symmetry about which the cutting insert 12 has five-fold rotational symmetry.

The insert pocket 16 comprises a base surface 18, a lower support wall 20 extending generally uprightly from the base surface 18, and an upper support 22 wall also extending generally uprightly from the base surface 18. The upper support wall 22 and lower support wall 20 form an acute angle α between them. In accordance with a specific application, the acute angle α is 36°, within manufacturing tolerances. The lower and upper support walls 20, 22, are integrally formed with the base surface 18. In other words, the lower and upper support walls 20, 22, along with the base surface 18 of the insert pocket 16 belong to a single continuous piece of material constituting the insert holder. Thus, the lower support wall 20, the upper support wall 22 and the insert holder together have a unitary, one-piece construction.

Figure 4:
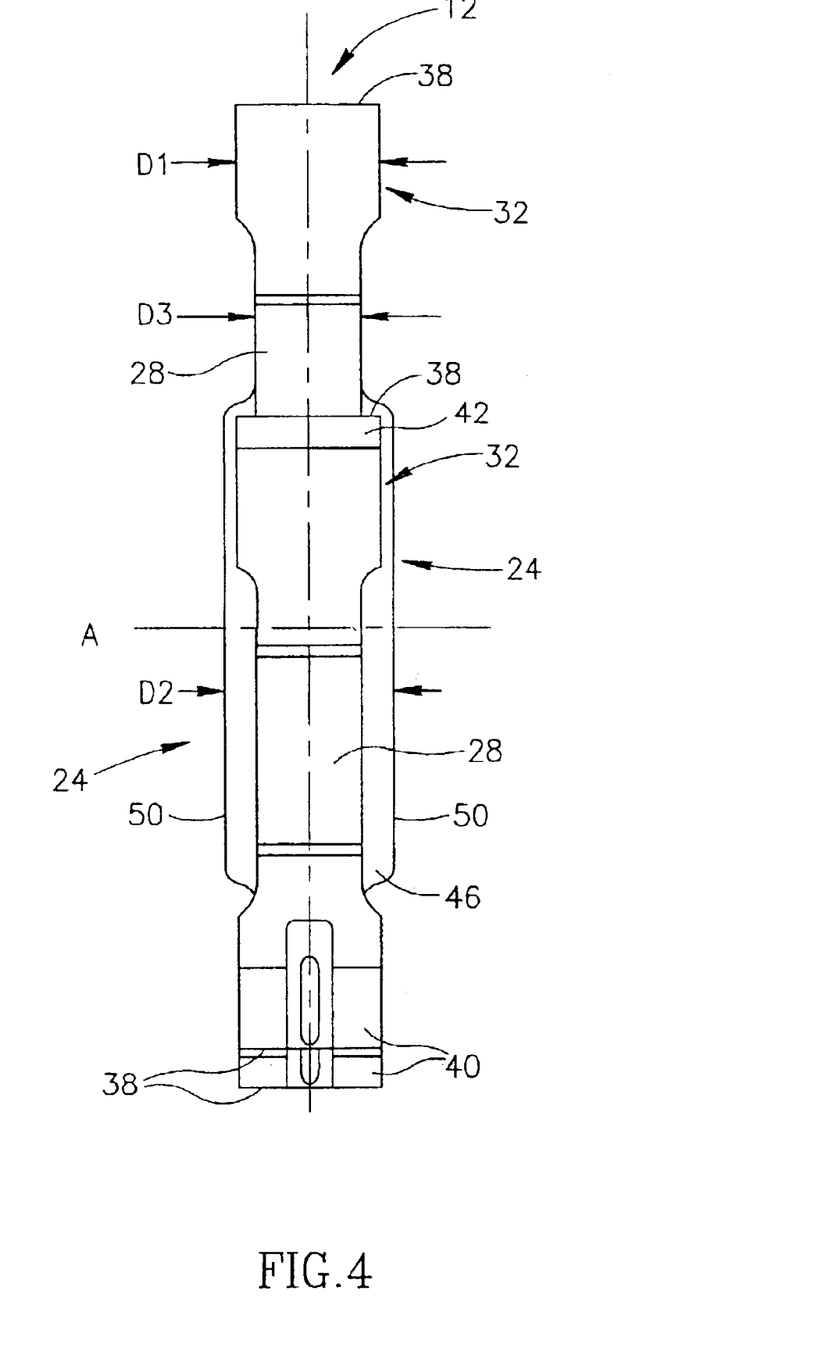
FIG. 4 is an edge-on view of the cutting insert shown in FIG. 1.

Attention is now additionally drawn to FIG. 4. The cutting insert 12 comprises two identical opposing side surfaces 24 and a peripheral edge surface 26 extending therebetween. Since the side surfaces 24 are identical, only one will be described, it being understood that the other side surface has identical structure. The peripheral edge surface 26 has five abutment sections 28 and five equally spaced apart cutting portions 32. Each of the five abutment sections 28 lies on a portion of a side wall 34 of an imaginary regular pentagon 36 (shown by a dashed line in FIG. 3) and are separated from one another by a given cutting portion 32.

Each cutting portion 32 of the cutting insert 12 is triangular shaped and extends outwurdly from the imaginary regular pentagon 36 of the cutting insert 12. At a radially outermost portion of each cutting portion 32 a cutting edge 38 is formed at the intersection of a rake surface 40, on a leading side 41 of the cutting portion 32, and a relief surface 42, a trailing aide 43 of the cutting portion 32. The leading and trailing sides 41, 43 of the cutting portion 32 are not radially directed. As can be seen, the cutting edges 38 are radially more distant from the insert axis A than the abutment sections 28, the entire cutting edge 38 of each cutting portion 32 being radially outward of the imaginary regular pentagon 36. If desired, each cutting edge 38 may extend between the two opposing side surfaces 24 and along a thickness of the peripheral edge surface 26. The rake and relief surfaces 40 and 42 being located on the peripheral edge surface 26. An operative cutting portion 32' projects from an end surface 44 (in FIG. 3 shown by a line of short dashes) of the insert holder 14 to cut a workpiece (not shown). An operative first abutment section 28' abuts the lower support wall 20, and an operative second abutment section 28" abuts the upper support wall 22. Clearly, the operative hint and second abutment sections 28', 28" form an angle between them substantially equal to the angle α. Apart from the operative first and second abutment sections 28', 28" no other portion of the peripheral edge surface 26 comes into contact with the insert holder 14. The operative first and second abutment sections 28', 28" divide the cutting insert 12 into two sections. A first section contains the operative cutting portion 32' and two cutting portions 32 on either side of the operative cutting portion 32'. The second section contains two adjacent cutting portions 32. Thus, as seen in FIG. 3, the operative first and second abutment sections 28', 28" belong to non-adjacent legs of the imaginary polygon, the operative first and second abutment sections 28', 28" being separated from one another by at least one non-operative abutment section, in either direction around the imaginary polygon.

As can be seen, each side surface 24 has a centrally located outwardly protruding portion in the form of a protruding pentagon 46 having a flat surface 50. The flat surfaces 50 of each protruding pentagon 46 are parallel to each other. The flat surface 50 of the protruding pentagon 46 is smaller in surface area than the imaginary pentagon 36. The surface 50 of the protruding pentagon 46 abuts the base surface 18 of the insert pocket 16. The protruding pentagon 46 is also angularly offset with respect to the imaginary pentagon about the insert axis A, such that a given side wall 52 of the protruding pentagon 46 is coplanar with the end surface 44 of the insert holder 14. This offset maximizes the contact area between the insert 12 and the insert holder 14 without reducing the depth of cut.

The cutting insert 12 has three width dimensions. A first width dimension D1, being the width of the cutting portion 32. A generally centrally located region of the cutting insert 12 has a second width dimension D2 between the flat surfaces 50 of the two protruding pentagons 46. A third width dimension D3, is defined by all other regions of the cutting insert 12 not included in the first and second width dimensions D1, D2. The second width dimension D2 is greater than the first width dimension D1, which ensures the cutting edge 38 does not abut the base surface 18 of the insert pocket 16. It will be appreciated that the cutting portion 32 slightly tapers inwardly from the cutting edge 38. That is, the first width dimension D1 is slightly variable, having a maximum value at the cutting edge 38 and decreasing in magnitude inwardly towards the insert axis A. This arrangement assures that the sides 24 of the cutting portions 32 are relieved from a workpiece during cutting operations.

An insert through bore 56 extends between the flat surface 50 of the protruding pentagon 46 and has a bore axis that is coincident with the insert axis A. The insert through bore 56 is countersunk on both sides. A screw 54 extends through the insert through bore 56 and threadingly engages a threaded receiving bore 57 in the base surface 18 of the insert pocket 16.

The lower support wall 20, the upper support wall 22, and the base surface 18 of the insert holder 14 and the screw 54 positively lock the cutting insert 12 in the insert pocket 16. The relative positioning of the lower support wall 20 and the upper support wall 22 are such that cutting forces exerted on the operative cutting portion 32' during cutting operations are exerted primarily on the lower support wall 20 and on the upper support wall 22 and only minimally on the screw 54. This removes the need for additional structure, such as a clamp, to positively lock the cutting insert 12 and limits the possibility of failure by the screw 54.

Although the present invention has been described to a certain degree of particularity, it should be understood that various alterations and modifications could be made without departing from the spirit or scope of the invention as hereinafter claimed. For example, a cutting insert could have four or six or more cutting portions instead of five. The width dimensions D1, D2, D3 can be changed to suit various applications. Furthermore, it will be appreciated that the present invention can also be applied to threading operations. The angle α may be modified to suit other geometrical configurations. A lever pin mechanism could be used in place of the screw.

What is claimed is:

1. A metal cutting tool comprising:
   an indexable cutting insert, comprising two opposing side surfaces, and a peripheral edge surface extending therebetween and having an insert axis of rotational symmetry passing through the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions; and
   an insert holder comprising an insert pocket in which the cutting insert is retained with the peripheral edge surface being abutted at two abutment sections only, the insert pocket comprising a lower support wall abutting a first abutment section, and an upper support wall abutting a second abutment section; the lower support wall and the upper support wall having a unitary, one-piece construction,
   wherein each cutting edge is located at an intersection of a relief surface and a rake surface,
   wherein the rake surface is located on the peripheral edge surface; and
   wherein the upper support wall and the lower support wall define an acute angle (α) between them.

2. The metal cutting tool according to claim 1, wherein the acute angle (α) is 360°.

3. The metal cutting tool according to claim 1, wherein the cutting portions are generally triangular in a side view of the cutting insert.

4. The metal cutting tool according to claim 1, wherein the cutting insert has a varying width dimension, taken in a direction parallel to the insert axis.

5. The metal cutting tool according to claim 4, wherein the cutting insert has three width dimensions, a first width dimension, D1, at the cutting portions, a second width dimension, D2, at a generally centrally located region of the cutting insert and a third width dimension D3, at all other regions of the cutting insert.

6. The metal cutting tool according to claim 5, wherein the second width dimension D2 is greater than the first width dimension D1, and the first width dimension D1 is greater than the third width dimension D3.

7. The metal cutting tool according to claim 6, wherein the generally centrally located region of the cutting insert having the second width dimension is polygonal in form from a side view of the cutting insert, thereby forming a protruding polygon from each side surface.

8. The metal cutting tool according to claim 7, wherein the imaginary polygon has a polygon axis coincident with the insert axis.

9. The metal cutting tool according to claim 8, wherein the protruding polygon is angularly offset from the imaginary polygon with respect to the insert axis.

10. The metal cutting tool according to claim 9, wherein the regular imaginary polygon is a regular imaginary pentagon;
    the cutting insert has five abutment sections, each abutment section lying on a portion of a side wall of the imaginary regular pentagon; five cutting portions spaced at regular intervals one from the other; and the protruding polygons are protruding pentagons, each protruding pentagon having an area smaller than a surface area of the imaginary pentagon and each protruding pentagon is angularly offset with respect to the imaginary pentagon.

11. The metal cutting tool according to claim 7, wherein the insert pocket comprises a base surface from which the lower and upper support walls generally uprightly extend, the base surface being abutted by a given protruding polygon of the cutting insert.

12. The metal cutting tool according to claim 11, wherein the cutting tool further comprises a screw, for securing the cutting insert in the insert pocket, the screw extending trough an insert trough bore and threadingly engaging a threaded receiving bore in the base surface; the insert trough bore extending between the two opposing side surfaces.

13. The metal cutting tool according to claim 12, wherein the insert through bore extends between the protruding polygons.

14. A metal cutting tool comprising:
    an indexable cutting insert, comprising two opposing side surfaces, and a peripheral edge surface extending therebetween and having an insert axis of rotational symmetry passing trough the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions; and
    an insert holder comprising an insert pocket in which the cutting insert is retained with the peripheral edge surface being abutted at two abutment sections only, the insert pocket comprising a lower support wall abutting a first abutment section, and an upper support wall abutting a second abutment section; the lower support wall and the upper support wall having a unitary, one-piece construction, wherein:

the regular imaginary polygon is a regular imaginary pentagon;

the cutting insert has five abutment sections, each abutment section lying on a portion of a side wall of the imaginary regular pentagon; and five cutting portions spaced at regular intervals one from the other; and the upper support wall and the lower support wall define an acute angle ($\alpha$) of 36° between them.

15. A metal cutting tool comprising:

an insert holder formed from a single continuous piece of material that includes an insert pocket having a lower support wall and an upper support wall, the lower and upper support walls defining an acute angle ($\alpha$) therebetween; and an indexable cutting insert, comprising two opposing side surfaces, and a peripheral edge surface extending therebetween and having an insert axis of rotational symmetry passing through the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions;

wherein:

the cutting insert is retained in the insert pocket with the peripheral edge surface being abutted at only two of said abutment sections with a first of said abutment sections being abutted by the lower support wall and a second of said abutment sections being abutted by the upper support wall;

the first and second of said abutment sections belong to non-adjacent legs of the imaginary regular polygon;

each cutting edge is located at an intersection of a relief surface and a rake surface; and the rake surface is located on the peripheral edge surface.

16. The metal cutting tool according to claim 15, wherein:

the regular imaginary polygon is a regular imaginary pentagon;

the cutting insert has five abutment sections, each abutment section lying on a portion of a side wall of the imaginary regular pentagon; and five cutting portions spaced at regular intervals one from the other; and said acute angle ($\alpha$) is 36°.

17. A metal cutting tool comprising:

an indexable cutting insert, comprising two opposing side surfaces, and a peripheral edge surface extending therebetween and having an insert axis of rotational symmetry passing through the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions; and an insert holder comprising an insert pocket in which the cutting insert is retained with the peripheral edge surface being abutted at two abutment sections only, the insert pocket comprising a lower support wall abutting a first abutment section, and an upper support wall abutting a second abutment section; the lower support wall and the upper support wall having a unitary, one-piece construction, wherein the entire cutting edge of each cutting portion is radially outward of the imaginary regular polygon; and wherein the upper support wall and the lower support wall define an acute angle ($\alpha$) between them.

18. A metal cutting tool comprising:

an indexable cutting insert, comprising two opposing side surfaces, and a peripheral edge surface extending therebetween and having an insert axis of rotational symmetry passing through the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions; and an insert holder comprising an insert pocket in which the cutting insert is retained with the peripheral edge surface being abutted at two abutment sections only, the insert pocket comprising a lower support wall abutting a first abutment section, and an upper support wall abutting a second abutment section; the lower support wall and the upper support wall having a unitary, one-piece construction, wherein the cutting edge of each cutting portion has an associated rake surface that is located on the peripheral edge surface; and wherein the upper support wall and the lower support wall define an acute angle ($\alpha$) between them.

19. A metal cutting tool comprising:

an indexable cutting insert, comprising two opposing side surfaces, and a peripheral edge surface extending therebetween and having an insert axis of rotational symmetry passing through the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions; and an insert holder comprising an insert pocket in which the cutting insert is retained with the peripheral edge surface being abutted at two abutment sections only, the insert pocket comprising a lower support wall abutting a first abutment section, and an upper support wall abutting a second abutment section; the lower support wall and the upper support wall having a unitary, one-piece construction, wherein the first and second abutment sections belong to non-adjacent legs of the imaginary regular polygon.

20. A metal cutting tool comprising:

an indexable cutting insert, comprising two opposing side surfaces, and a peripheral edge surface extending therebetween and having an insert axis of rotational symmetry passing through the side surfaces; the peripheral edge surface having a plurality of abutment sections, each abutment section lying on a portion of a side wall of an imaginary regular polygon having a plurality of side walls, a plurality of cutting portions extending outwardly from the imaginary polygon, the plurality of cutting portions being equal in number to the number of side walls of the imaginary polygon, each cutting portion having a cutting edge, each abutment section being located between two cutting portions; and an insert holder comprising an insert pocket in which the cutting insert is retained with the peripheral edge surface being abutted at two abutment sections only, the insert pocket comprising a lower support wall abutting a first abutment section, and an upper support wall abutting a second abutment section; the lower support wall and the upper support wall having a unitary, one-piece construction, wherein each cutting edge extends between the two opposing side surfaces and along a thickness of the peripheral edge surface; and wherein the upper support wall and the lower support wall define an acute angle ($\alpha$) between them.

* * * * *

UNITED STATES PATENT AND TRADEMARK OFFICE
CERTIFICATE OF CORRECTION

PATENT NO. : 6,942,434 B2  
APPLICATION NO. : 10/365626  
DATED : September 13, 2005  
INVENTOR(S) : Jacob Friedman et al.

Page 1 of 1

It is certified that error appears in the above-identified patent and that said Letters Patent is hereby corrected as shown below:

Col. 5, line 63-64, should read;  
\*\*2. The metal cutting tool according to claim 1, wherein the acute angle (α) is 36°.\*\*

Signed and Sealed this

Third Day of April, 2007

JON W. DUDAS  
*Director of the United States Patent and Trademark Office*